United States Patent
Haussmann

(10) Patent No.: US 9,593,716 B2
(45) Date of Patent: Mar. 14, 2017

(54) VERTICAL SHAFT WITH A SLIDE BEARING FOR A TURBINE OR A GENERATOR

(71) Applicant: Voith Patent GmbH, Heidenheim (DE)

(72) Inventor: Rainer Haussmann, Ballmertshofen (DE)

(73) Assignee: VOITH PATENT GMBH, Heidenheim (DE)

( * ) Notice: Subject to any disclaimer, the term of this patent is extended or adjusted under 35 U.S.C. 154(b) by 0 days.

(21) Appl. No.: 14/407,678

(22) PCT Filed: Jul. 12, 2013

(86) PCT No.: PCT/EP2013/064777
§ 371 (c)(1),
(2) Date: Dec. 12, 2014

(87) PCT Pub. No.: WO2014/009518
PCT Pub. Date: Jan. 16, 2014

(65) Prior Publication Data
US 2015/0152913 A1 Jun. 4, 2015

(30) Foreign Application Priority Data
Jul. 13, 2012 (DE) .................. 10 2012 013 986

(51) Int. Cl.
*F16C 32/06* (2006.01)
*F03B 11/06* (2006.01)
(Continued)

(52) U.S. Cl.
CPC ........ *F16C 32/0629* (2013.01); *F03B 11/066* (2013.01); *F16C 33/105* (2013.01);
(Continued)

(58) Field of Classification Search
CPC ........ F16C 17/04; F16C 17/10; F16C 33/103; F16C 33/1045; F16C 33/105; F16C 33/106;
(Continued)

(56) References Cited

U.S. PATENT DOCUMENTS 4,494,882 A * 1/1985 Pollok .................. F03B 11/066
384/303
4,964,740 A * 10/1990 Nakano .................. F16C 17/12
384/313
(Continued)

FOREIGN PATENT DOCUMENTS

CH   365 131      10/1962
DE   1813 807     6/1960
(Continued)

OTHER PUBLICATIONS

International Search Report dated Oct. 25, 2013 in corresponding International Application No. PCT/EP2013/064777.

*Primary Examiner* — Alan B Waits
(74) *Attorney, Agent, or Firm* — Faegre Baker Daniels LLP

(57) ABSTRACT

A vertical shaft with a slide bearing for a turbine or generator. The invention relates to a vertical shaft (1) with a hydrodynamic slide bearing (2) comprising the following features or components: •—an annular fixed bearing housing (3) which surrounds the shaft (1); •—a plurality of bearing segments (4) which are fixed components of the bearing housing (3), surround and support the shaft (1) and form a bearing gap (5) therewith; •—the shaft (1) has a radially inner oil trough (1.2) and radially outer oil trough (1.3) communicating therewith; •—an oil lubrication system in which the oil flows through the following components: •—the bearing housing (3); •—a first connection line from the bearing housing (3) to the inner oil trough (1.2); •—an
(Continued)

overflow channel (1.4) from the upper end of the radially inner oil trough (1.2) to the upper end of the radially outer oil trough (1.3); •—bores (7) from the radially outer oil trough (1.3) to the bearing housing (3); •—and a cooling device (10) with connections to the bearing housing (3). The invention is characterised by the following features: •—a scoop shovel is provided, which is a component of the guide pipe; •—the guide pipe (9) is a component of a conducting connection between the bores (7) and the cooling device (10).

2 Claims, 2 Drawing Sheets

(51) Int. Cl.
*F16C 33/10* (2006.01)
*F16C 35/00* (2006.01)
*F16C 37/00* (2006.01)

(52) U.S. Cl.
CPC .......... *F16C 33/1045* (2013.01); *F16C 35/00* (2013.01); *F16C 37/002* (2013.01); *Y02E 10/226* (2013.01)

(58) Field of Classification Search
CPC .............. F16C 33/1085; F16C 33/0629; F16C 2360/00; F16C 37/002; F16C 35/00; F03B 11/06–11/066; Y02E 10/226
See application file for complete search history.

(56) References Cited

U.S. PATENT DOCUMENTS 5,827,040 A * 10/1998 Bosley ................. F01D 25/168
415/106
6,302,667 B1 * 10/2001 Timuska ............. F04C 29/0021
184/6.16

FOREIGN PATENT DOCUMENTS

| | | | | |
|---|---|---|---|---|
| DE | CH 456258 A | * | 5/1968 | ............ F16C 32/064 |
| DE | 14 00 438 | | 5/1970 | |
| FR | 1246095 A | * | 11/1960 | ............ F03B 11/066 |
| GB | 571745 A | * | 9/1945 | ............ F16C 37/002 |
| JP | 2903641 B2 | * | 6/1999 | ............ F16C 37/002 |
| SE | 121 957 | | 6/1948 | |

* cited by examiner

VERTICAL SHAFT WITH A SLIDE BEARING FOR A TURBINE OR A GENERATOR

CROSS-REFERENCE TO RELATED APPLICATION

The present application is a National Stage of International Application No. PCT/EP2013/064777, filed Jul. 12, 2013, which claims priority to German Application No. 10 2012 013 986.1, filed Jul. 13, 2012, the entire disclosures of which are hereby expressly incorporated herein by reference.

The invention concerns a shaft with a hydrodynamic slide bearing. The shaft is arranged vertically and the slide bearing is a radial bearing.

The bearing has an annular fixed bearing housing which surrounds the shaft, it is supported by the environment. The bearing exhibits as known a plurality of bearing segments. They face the shaft and support the shaft. They form a bearing gap with the envelope surface of the shaft.

The lubrication of the bearing is of extreme importance. The bearing gaps aforementioned must be lubricated constantly. To do so, it is necessary to guide oil in a circuit whereas it flows through an external cooler among other things. Known systems utilise an external pump to keep the oil in circulation. Said pump results in additional levels of investment. It requires constant maintenance. A failure of the pump may result in considerable damages of the involved components, in particular of the shaft.

DE 1 813 807 U describes a vertical shaft with several slide bearings. Said slide bearings are configured as hydrodynamic slide bearings. An annular fixed bearing housing is moreover provided which surrounds the shaft. A plurality of bearing segments are fixed constituents of the bearing housing, which surround and support the shaft and form therewith a bearing gap. An inner oil trough communicates with the bearing housing. The oil flows through the bearing housing as well as a connection line from the bearing housing to the inner oil trough.

DE 14 00 438 B describes a step bearing with a vertical shaft. To do so, an oil circuit is provided, which among other things connects a chamber, a pressure chamber as well as a gap space together.

The object of the invention is then to configure a vertical turbine or generator shaft with a hydrodynamic slide bearing according to the preamble of claim 1 in such a way that the oil lubrication system can be designed more easily and more cost efficiently than systems known so far, and provides higher reliability.

This object is met by the features of claim 1.

The fundamental idea of the invention consists in evacuating a feed impulse from the rotational energy of the shaft, which keeps the oil steadily in circulation in the oil lubrication system.

This object is met by a device which includes the features of claim 1. This also enables to generate a pressure in the oil lubrication system which produces a sufficient circulation of the oil. External additional devices are not necessary.

The invention is described below with reference to the drawing. The following details are shown:

FIG. 1 shows a unit according to the invention with a shaft 1 and a bearing 2 in an axial section.

FIG. 2 shows a guiding pipe with a scoop shovel situated at the end thereof, and more precisely in a side view 2*a*, in a view 2*b* rotated with respect to the view 2*a* as well as in a section 2*c* following the cutting line A-A.

Figure 1:
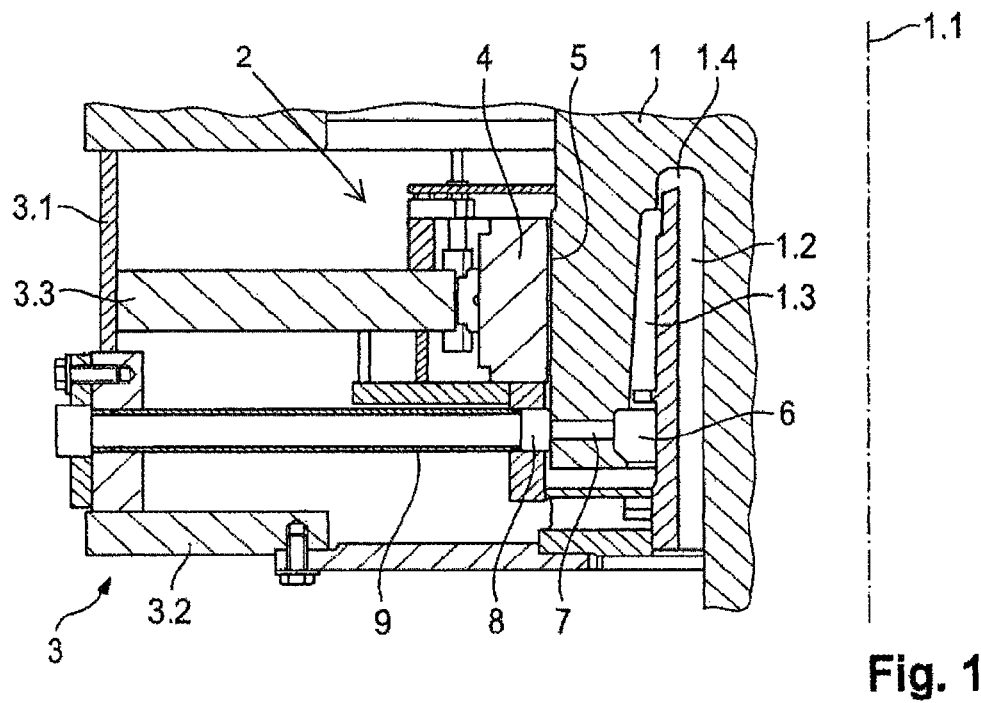

The shaft 1 supports a rotor (not represented here) of a water turbine. It runs vertically. See the rotational axis 1.1;

The bearing 2 is annular. It is fixed and torque-proof.

It includes a housing 3. The housing 3 has the configuration of an annular chamber, which surrounds the shaft 1 concentrically. Important parts of the housing 3 are a cylindrical peripheral wall 3.1 as well as an annular bottom 3.2 and a supporting ring 3.3. The supporting ring 3.3 is welded to the peripheral wall 3.1.

Further important components are bearing segments 4. These are for instance in the form of strips or plates. They are arranged in a plurality all around the shaft 1. They form a bearing gap 5 with the envelope surface of the shaft 1. The bearing gaps 5 aforementioned must be lubricated.

The shaft has an inner oil trough 1.2. It extends over a certain length of the shaft 1 parallel to the rotational axis 1.1. The shaft 1 moreover presents an outer oil trough 1.3 which also runs parallel to the rotational axis 1.1 and communicates with the inner annular gap via an overflow 1.4.

An annular storage chamber, which extends around the rotational axis 1.1 as a closed annular chamber, is situated at the lower end of the outer oil trough 1.3 of the shaft. A plurality of bores 7 running in radial direction are connected to said annular chamber. They are for their own part in conducting connection with a guiding pipe 9. A scoop shovel 8, which is extremely important for the invention, as will be explained later, is situated at the inlet end of the guiding pipe 9. A cooling device is connected to the other end of the guiding pipe 9. It is not shown here, but in FIG. 4.

During operation, the lubricant, generally oil, flows from the annular storage chamber 6 into the bores 7. The centrifugal force following the rotation of the shaft 1 conveys the oil through the bores 7 to the scoop shovel 8. The oil crashes there onto the scoop shovel. Consequently, the kinetic energy contained in the oil is transformed into pressure energy.

The result is a pressure which is big enough to convey the oil through the guiding pipe 9 to the cooling device.

Figure 2A:
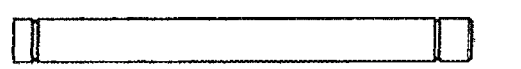
Figure 2B:
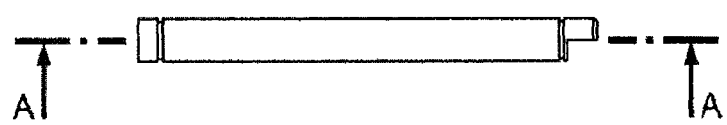
Figure 2C:
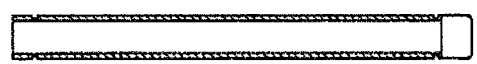

The guiding pipe 9 and the scoop shovel 8 are as single pieces. See FIG. 2 with the FIGS. 2*a* to 2*c*.

Figure 3:
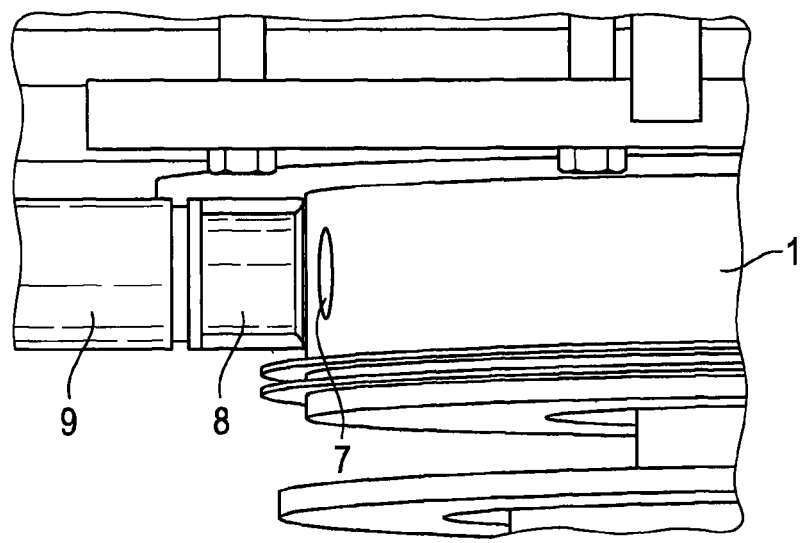
FIG. 3 shows in enlarged view the region around the scoop shovel.

FIG. 3 enables to see the relationships in detail. The bores 7 in the shaft 1 generate the accumulation of pressure which is necessary to the circulation of oil. We are dealing here with a punch pump. The scoop shovel 8 enables to increase the pressure further so that the oil flows through the whole circuit.

Figure 4:
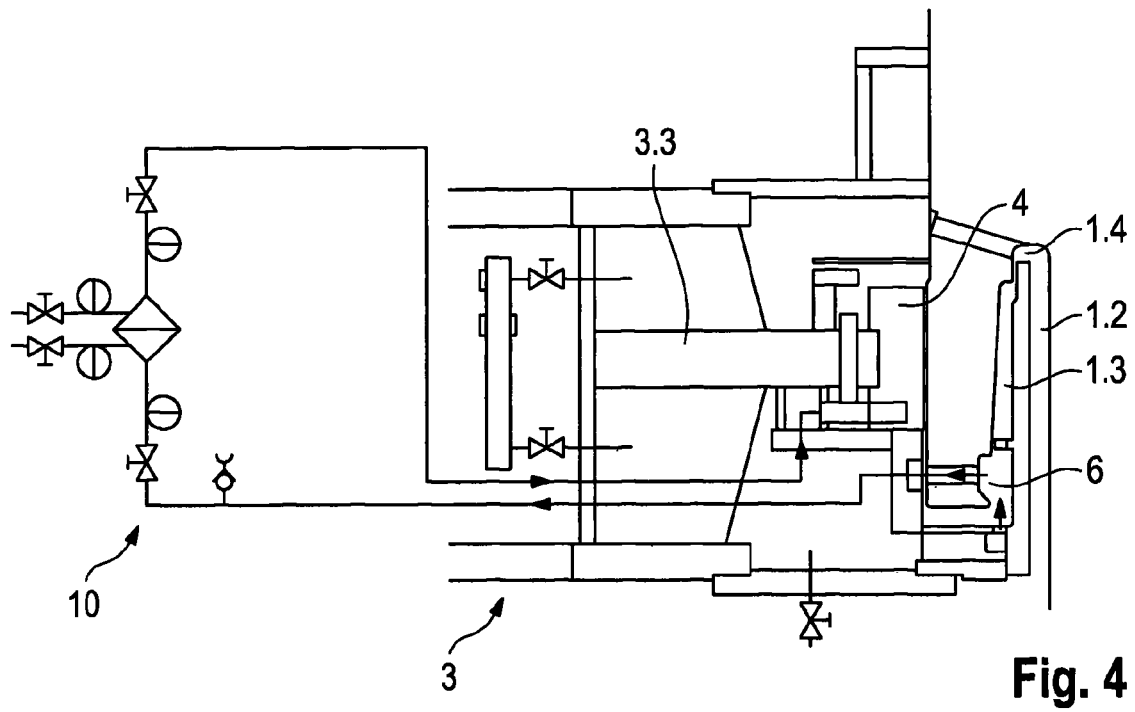
FIG. 4 shows in schematic representation the course of the lubricant.

FIG. 4 shows the path of the oil, indicated by arrows. The oil flows through a cooling device 10 among other things.

LIST OF REFERENCE SIGNS

1 Shaft
1.1 Rotational axis
1.2 Inner oil trough
1.3 Outer oil trough
1.4 Overflow
2 Bearing
3 Housing
3.1 Cylindrical peripheral wall of the housing
3.2 Annular bottom of the housing
3.3 Supporting ring
4 Bearing segment
5 Bearing gap 6 Storage chamber
7 Bores
8 Scoop shovel
9 Guiding pipe
10 Cooling device

The invention claimed is:
1. A vertical shaft with a hydrodynamic slide bearing, comprising:
   an annular fixed bearing housing, which surrounds the shaft;
   a plurality of bearing segments, which are fixed constituents of the bearing housing,
   which surround and support the shaft, and form therewith a bearing gap;
   the shaft has a radially inner oil trough as well as a radially outer oil trough communicating therewith;
   an oil lubrication system, in which the oil flows through the following components:
   the bearing housing;
   a first connection line from the bearing housing to the inner oil trough;
   an overflow channel from the upper end of the radially inner oil trough to the upper end of the radially outer oil trough;
   bores from the radially outer oil trough to the bearing housing;
   a cooling device with connections to the bearing housing, comprising:
   a scoop shovel is provided, which is a component of a guiding pipe;
   the guiding pipe which is an integral part of a conducting connection between the bores and the cooling device.

2. A vertical shaft with a hydrodynamic slide bearing according to claim 1, wherein the scoop shovel is directly connected downstream of the bores.

* * * * *